US006974142B1

(12) United States Patent
Shikinami et al.

(10) Patent No.: US 6,974,142 B1
(45) Date of Patent: Dec. 13, 2005

(54) VEHICLE TO ASSIST WALKING

(75) Inventors: Hiroko Shikinami, Kanazawa (JP); Shigeru Onishi, Kanazawa (JP)

(73) Assignee: Nippon Clean Engine Research Institute Co., Ltd., Kanazawa (JP)

( * ) Notice: Subject to any disclaimer, the term of this patent is extended or adjusted under 35 U.S.C. 154(b) by 0 days.

(21) Appl. No.: 09/869,883

(22) PCT Filed: May 26, 2000

(86) PCT No.: PCT/JP00/03418

§ 371 (c)(1), (2), (4) Date: Aug. 17, 2001

(87) PCT Pub. No.: WO01/35893

PCT Pub. Date: May 25, 2001

(30) Foreign Application Priority Data

Nov. 13, 1999 (JP) ................................ 11-359648
Jan. 13, 2000 (JP) ............................ 2000-042019

(51) Int. Cl.[7] ................................................ B62M 1/14
(52) U.S. Cl. .................................................. 280/250.1
(58) Field of Search ........................ 280/250.1, 87.021, 280/87.05, 87.051; 297/6, 5; 135/67

(56) References Cited

U.S. PATENT DOCUMENTS 2,374,182 A * 4/1945 Duke ............................ 297/6
3,354,893 A * 11/1967 Schmerl ...................... 135/67
3,516,425 A * 6/1970 Rigal .......................... 135/67
3,788,695 A 1/1974 Salem
4,074,683 A * 2/1978 Di Chiara .................... 135/67
4,212,493 A * 7/1980 Ledesky ........................ 297/6
4,345,790 A * 8/1982 Coe .............................. 297/6
4,373,756 A * 2/1983 Purdy et al. ................ 297/153
4,893,826 A 1/1990 Ward et al.
5,148,559 A * 9/1992 Morris ......................... 5/86.1
5,348,336 A * 9/1994 Fernie et al. ............... 280/641
5,380,262 A * 1/1995 Austin .......................... 482/68
5,419,571 A * 5/1995 Vaughan .................. 280/250.1
5,882,067 A * 3/1999 Carbajal et al. ............... 297/6
6,619,681 B2 * 9/2003 Gutierrez ................. 280/250.1

FOREIGN PATENT DOCUMENTS

| | | |
|---|---|---|
| CN | 2261833 Y | 9/1997 |
| CN | 2289548 Y | 9/1998 |
| JP | 04049965 | 2/1992 |
| JP | A-06-039007 | 2/1994 |
| JP | U 3015897 | 5/1995 |
| JP | A 9-308663 | 12/1997 |
| JP | A 10-225489 | 8/1998 |
| JP | A 10-234800 | 9/1998 |
| JP | A 11-56914 | 3/1999 |
| JP | A 11-70146 | 3/1999 |
| TW | 408604 | 10/2000 |
| WO | WO 88/00460 | 1/1988 |
| WO | WO 89/07432 | 8/1989 |

* cited by examiner

*Primary Examiner*—Lesley D. Morris
*Assistant Examiner*—Paul Royal, Jr.
(74) *Attorney, Agent, or Firm*—Oliff & Berridge, PLC

(57) ABSTRACT

A vehicle which has a function to help a person walk and a function that a helper can move a person, comprises a frame (1) extending around a body of a user for supporting the body of the user when the user walks using the vehicle, wheels (7,9) mounted on the frame, and a seat plate (11) which can project from the generally lateral side of the user into an area where the legs of the waling user move. The seat plate is withdrawn from the area where the legs of the walking user move when the user walks using the vehicle.

7 Claims, 7 Drawing Sheets

VEHICLE TO ASSIST WALKING

TECHNICAL FIELD

The invention relates to a vehicle to assist walking having a function to help a person walk, and a function to help move a person.

BACKGROUND ART

A vehicle to assist walking for assisting a person with disabled legs to walk is known. Such a vehicle to assist walking is disclosed for example in Japanese Unexamined Patent Publication No. 6-39007. The vehicle to assist walking disclosed in this publication comprises an upper frame which extends rearwards from the front side of the user to the lateral sides thereof, a lower frame which extends rearwards from the front side of the user to the lateral sides thereof, and connecting frames which connect the upper and lower frames. Front wheels are mounted on the lower frame at the front area thereof, and rear wheels are mounted on the upper frame at the rear area thereof. The user can stand within a space surrounded by the upper and lower frames and walk while user's body is supported by the upper frame.

The user uses such a vehicle to assist walking to move to a destination or for rehabilitation. During walking, the user may become exhausted and thus need to take a rest without using the user's legs even if the user uses the vehicle to assist walking since the user's legs are disabled. In this case, in consideration of the relief of the user during walking, it is preferable to be able to rest on the vehicle to assist walking. In the vehicle to assist walking disclosed in the above mentioned publication, however, the user cannot rest without using the user's legs.

Further, it is preferable to use the vehicle to assist walking as a support for the body of the user when the user has arrived at a destination using the vehicle to assist walking. That is, it is preferable that the vehicle to assist walking can be used as a support for the body of the user in addition to being used as a walking assistant. For example, it is very convenient for the user to use the vehicle to assist walking to move to a restroom, and to use the vehicle to assist walking as a support for the body of the user when the user arrives at a restroom.

In view of these situations, a first object of the invention is to allow the user to rest without using the user's legs when the user becomes exhausted when the user uses the vehicle to assist walking. Further, a second object of the invention is to allow the user to use the vehicle to assist walking as a support for the body of the user when the user arrives at a restroom.

DISCLOSURE OF INVENTION

To accomplish the first object, in the first invention, there is provided a vehicle to assist walking having functions to help a person walk, and for a helper to move a person, wherein the vehicle comprises a frame extending around the body of the user of the vehicle to support the body of the user when the user walks using the vehicle, wheels mounted on the frame, and a seat plate which can project from around the lateral side of the user to an area where the legs of the walking user move, and wherein the seat plate is removed from the area where the legs of the walking user move when the user walks using the vehicle.

In the second invention according to the first invention, the seat plate can be pivoted about a predetermined axis, and the seat plate is projected to the area where the legs of the walking user move by pivoting the seat plate.

In the third invention according to the second invention, the predetermined axis is a horizontal axis.

In the fourth invention according to the first invention, the seat plate comprises a pair of seat plate portions, and the seat plate portions can project from each lateral side of the user to the area where the legs of the walking user move.

In the fifth invention according to the first invention, the seat plate can project from around the lateral and rear side of the user to the area where the legs of the walking user move.

In the sixth invention according to the first invention, the level of the lowest portion of the frame which is located in front of the user is higher than that of a seat of a stool, and the width between the portions of the frame which is located around the lateral and front side of the user is larger than that of the stool.

In the seventh invention according to the sixth invention, the seat plate comprises a pair of seat plate portions, and the seat plate portions can project from each lateral side of the user to the area where the legs of the walking user move, and the level of the seat plate portions is higher than that of the seat of the stool and the seat plate portions form a space therebetween when the seat plate portions project to the area where the legs of the walking user move.

To accomplish the second object, in the eighth invention, there is provided a vehicle to assist walking for assisting a person to walk, comprising a frame extending around the body of the user of the vehicle to support the body of the user when the user walks using the vehicle, and wheels mounted on the frame, and wherein the level of the lowest portion of the frame which is located in front of the user is higher than that of a seat of a stool, and wherein the width between the portions of the frame which is located around the lateral and front side of the user is larger than that of the stool.

In the ninth invention according to the eighth invention, the seat plate comprises a pair of seat plate portions, and the seat plate portions can project from each lateral side of the user to the area where the legs of the walking user move, and the level of the seat plate portions is higher than that of the seat of the stool and the seat plate portions form a space therebetween when the seat plate portions project to the area where the legs of the walking user move.

BEST MODE FOR CARRYING OUT THE INVENTION

Figure 1:
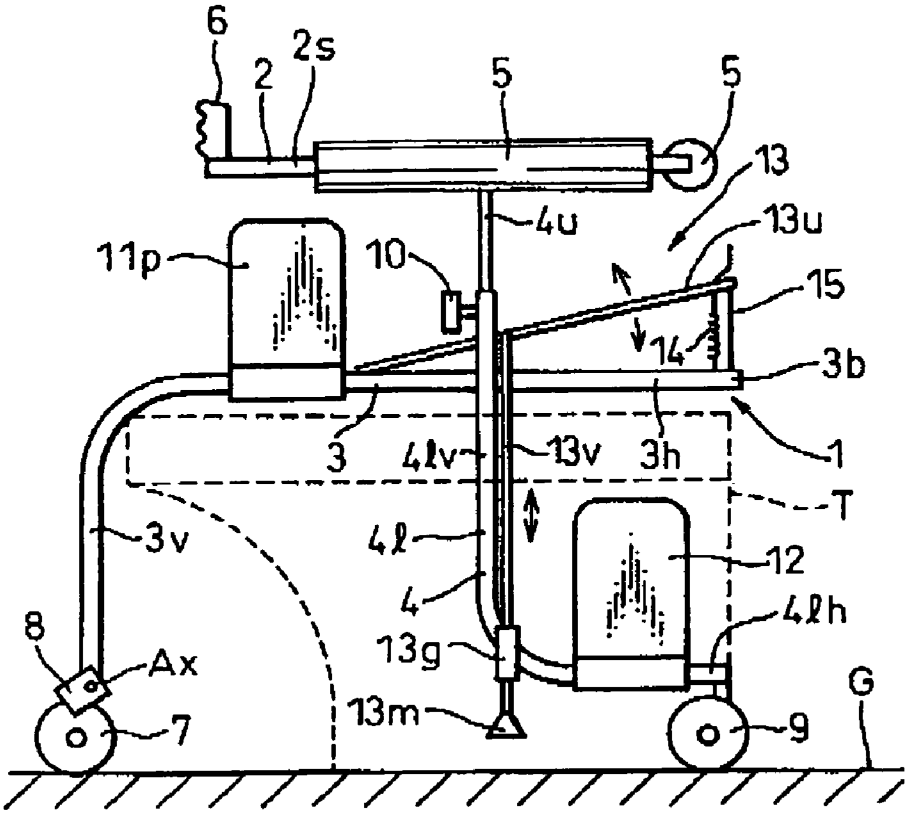
FIG. 1 is a side view of an embodiment of the invention.
Figure 2:
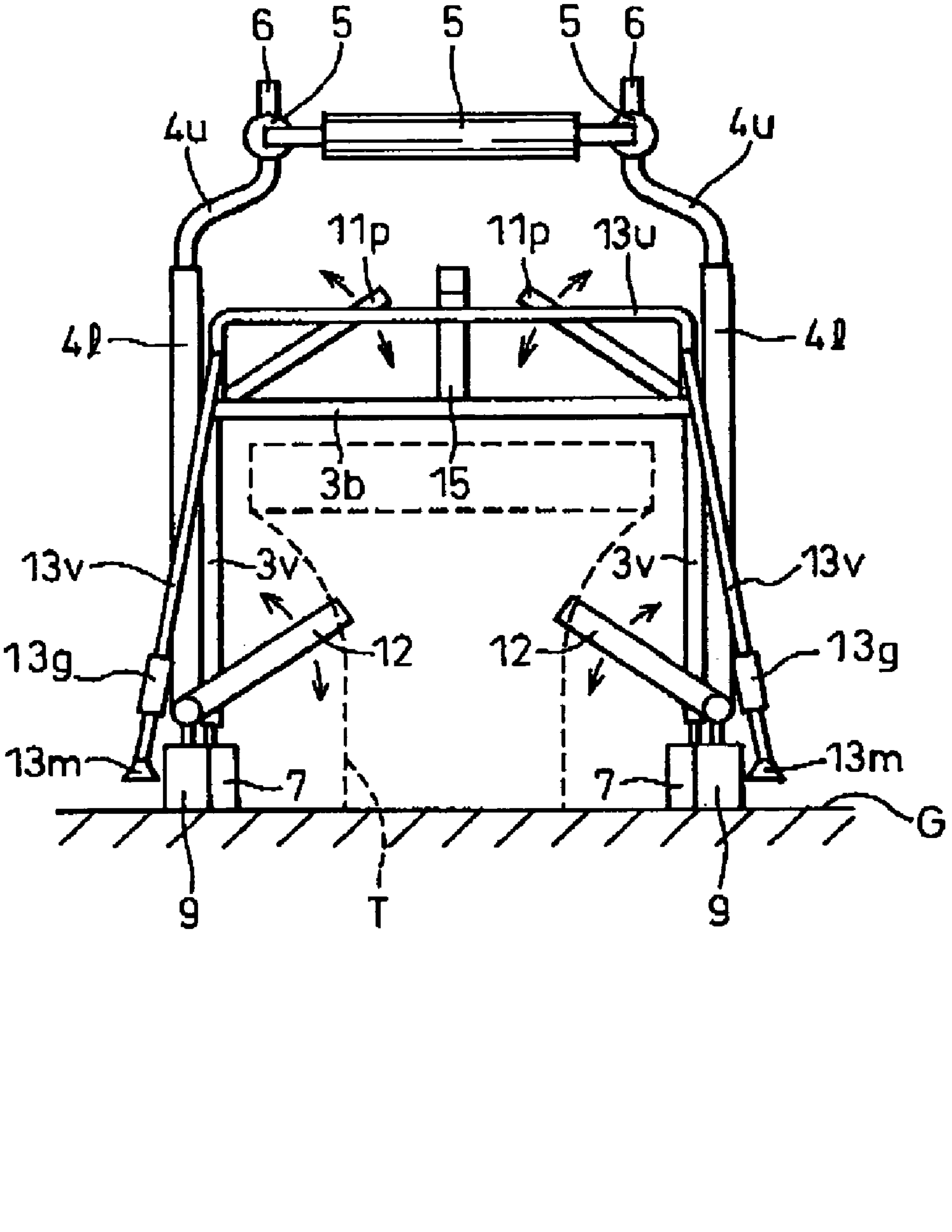
FIG. 2 is a front view of the embodiment shown in FIG. 1.

In the below, the invention will be explained in detail with reference to embodiments shown in the drawings. FIG. 1 shows a side view of an embodiment of a vehicle to assist walking of the invention, and FIG. 2 shows a front view of the embodiment shown in FIG. 1. Note that, below, for the sake of convenience in the explanation, the right side in FIG. 1 is referred to as "front", the left side in FIG. 1 is referred to as "rear", the upper side in FIG. 1 is referred to as "upper", the lower side in FIG. 1 is referred to as "lower", and the left and right sides in FIG. 2 are referred to as "lateral". Further, in FIG. 2, the term "upper" refers to the upper side, and the term "lower" refers to the lower side.

As shown in FIG. 1, the vehicle of the embodiment comprises a frame 1 which extends to surround the user. The frame 1 has an upper frame 2, a lower frame 3, and connecting frames 4 for connecting the upper and lower frames 2 and 3.

The upper frame 2 is generally U-shaped and extends from the front area of the vehicle toward the lateral rear sides thereof. The upper frame 2 is constituted from a hollow pipe having a rectangular cross section. Of course, the upper frame 2 may have any cross section, for example, a circular cross section other than the rectangular cross section. Elastic cushions 5 are mounted around a front portion 2*f* of the upper frame 2, and portions 2*s* (hereinafter referred to as upper frame lateral portions) which both extend in a longitudinal direction. Further, handles 6 are removably mounted on the rearmost portions of the upper frame lateral portions 2*s*. Although the shown handles 6 extend vertically upwards, the handles 6 may be provided extending toward any direction other than the vertical upward direction if necessary.

On the other hand, the lower frame 3 is generally U-shaped and extends from the front area of the vehicle toward the lateral rear sides thereof, similar to the upper frame 2, but the rear portions thereof are bent downwards and extend vertically downwards. In the following explanation, the portion which is horizontal relative to a surface of a floor and extends from the front area of the vehicle toward the lateral rear sides thereof is referred to as lower frame horizontal portion 3*h*, and the portion which extends vertically downwards is referred to as lower frame vertical portion 3*v*. Wheels 7, called free casters (hereinafter referred to as rear wheels), which can freely change their moving directions to any direction, are mounted on the lower ends of the lower frame vertical portions 3*v*. Further, means 8 for fixing the moving direction of the rear wheels 7, if necessary, is mounted on the lower ends of the lower frame vertical portions 3*v*. The moving direction fixing means 8 is a frame member having U-shape and mounted on the lower portions of the lower frame vertical portions 3*v* so that the member can rotate about a predetermined horizontal axis Ah. When the member 8 rotates downwards, the rear wheel 7 is introduced into the member 8, and thus the moving direction of the rear wheel 7 is fixed, for example, at the longitudinal direction. The lower frame 3 is constituted from a hollow pipe having a circular cross section, but may be constituted from a hollow pipe having any cross section, for example, oval cross section other than the circular cross section.

The connecting frames 4 have upper portions (hereinafter referred to as connecting frame upper portions) 4*u* and lower portions (hereinafter referred to as connecting frame lower portions) 4*l*. Each of these portions 4*u* and 4*l* is constituted from a hollow pipe having a circular cross section, but may be constituted from a hollow pipe having any cross section, for example, oval cross section other than the circular cross section. The upper ends of the connecting frame upper portions 4*u* are connected to generally central portions of the upper frame lateral portions 2*s*, and the connecting frame upper portions 4*u* extend downwards from the central portions of the upper frame lateral portions 2*s* where the upper ends of the connecting frame upper portions 4*u* is connected. The outer diameter of the connecting frame upper portion 4*u* is smaller than the inner diameter of the connecting frame lower portion 4*l*, and thus the lower end of the connecting frame upper portion 4*u* is inserted into the connecting frame lower portion 4*l*. AS explained below in detail, the connecting frame upper portions 4*u* are slidably mounted on the connecting frame lower portions 4*l*.

The connecting frame lower portions 4*l* extend vertically downwards from its upper ends, and are bent horizontally forwards near the surface of the floor. In the following explanation, the portions of the connecting frame lower portions 4*l* which extend vertically downwards are referred to as vertical portions 4*lv*, and the portions which extend horizontally forwards are referred to as horizontal portions 4*lh*. Wheels 9, called free casters (hereinafter referred to as front wheels), which can freely change their moving directions to any direction, are mounted on the lower frontmost portions of the connecting frames 4 (that is, the frontmost portions of the horizontal portions 4*lh* of the connecting frame lower portions 4*l*).

Screw type fasteners 10 are provided around the upper ends of the connecting frame lower portions 4*l*. When the fastener 10 is rotated and released, the connecting frame upper portion 4*u* can be slid relative to the connecting frame lower portion 4*l*. On the other hand, when the fastener 10 is rotated and tightened, the connecting frame upper portion 4*u* is fastened relative to the connecting frame lower portion 4*l* by the end of the screw of the fastener 10. In this way, the connecting frame upper portion 4*u* is positioned at a desired position relative to the connecting frame lower portion 4*l*, and thus the upper frame 2 is positioned at a desired level from the floor.

The generally central portions of the lower frame horizontal portions 3*h* are connected to the vertical portions 4*lv* of the connecting frame lower portions 4*l*. Therefore, the upper and lower frames 2 and 3 are connected by the connecting frames 4.

Figure 3:
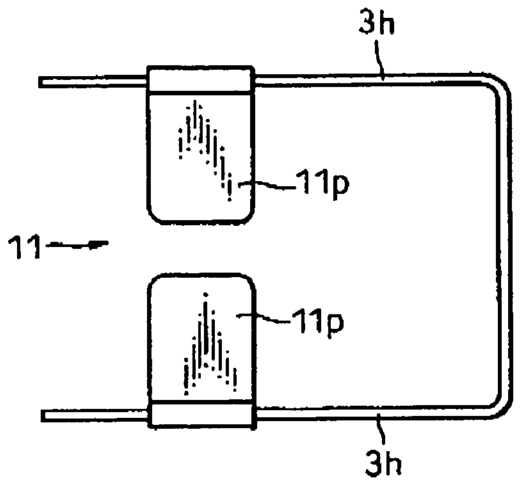
FIG. 3 is a plan view of a seat plate of the embodiment shown in FIG. 1.
Figure 4:
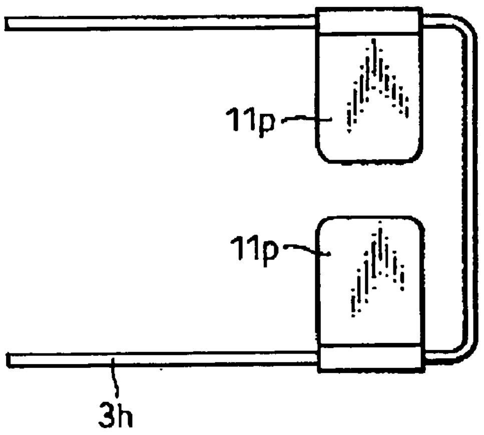
FIG. 4 is a plan view, similar to FIG. 3, of a seat plate of a second embodiment.
Figure 5:
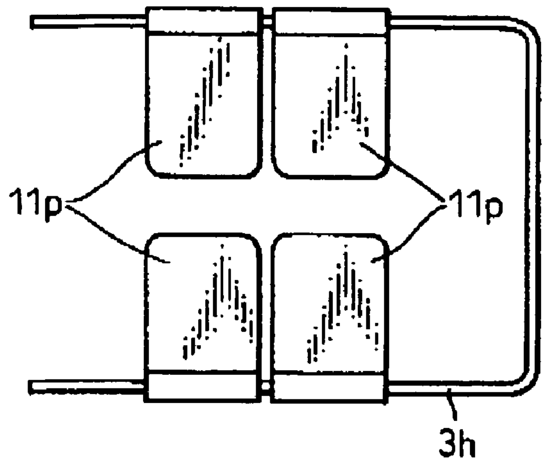
FIG. 5 is a plan view, similar to FIG. 3, of a seat plate of a third embodiment.
Figure 6:
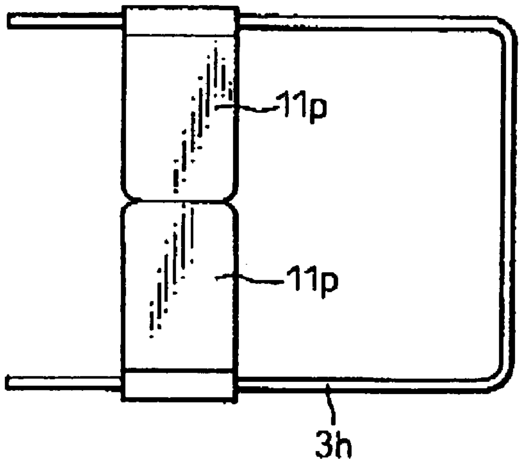
FIG. 6 is a plan view, similar to FIG. 3, of a seat plate of a fourth embodiment.
Figure 7:
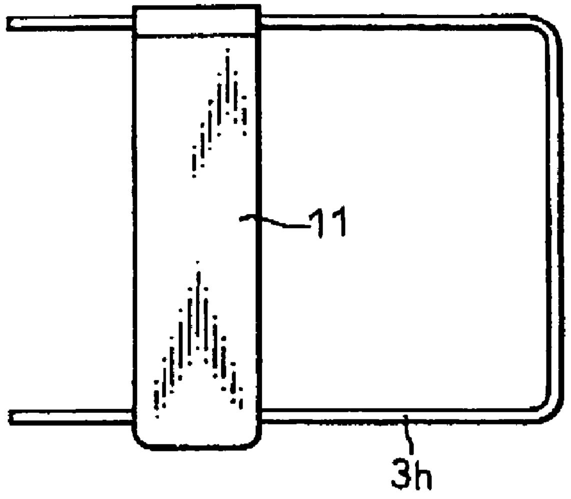
FIG. 7 is a plan view, similar to FIG. 3, of a seat plate of a fifth embodiment.
Figure 8:
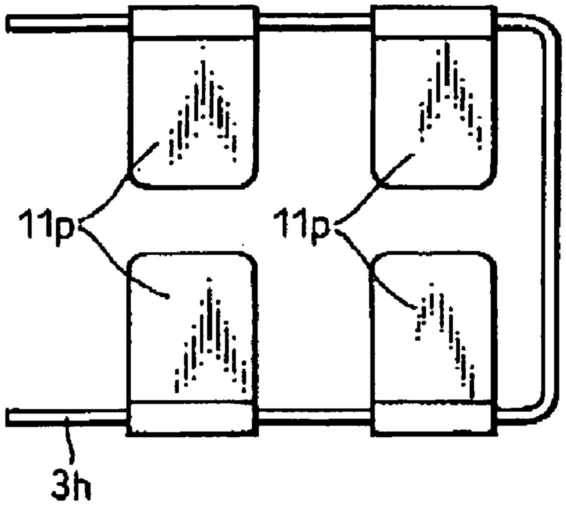
FIG. 8 is a plan view, similar to FIG. 3, of a seat plate of a sixth embodiment.

As the portion where the lower and connecting frames 3 and 4 are connected is referred to as frame connecting portion, a pair of left and right seat plate portions 11*p* is mounted on the lower frame horizontal portions 3*h* at the rear side of the frame connecting portions. Each seat plate portion 11*p* is mounted on the lower frame horizontal portion 3*h* so that the seat plate portion 11*p* can pivot about the horizontal axis extending in the longitudinal direction. Each seat plate portion 11*p* can pivot between a state where the seat plate portion extends vertically upwards (hereinafter referred to as vertical state) and a state where the seat plate portion extends horizontally inwards (hereinafter referred to as horizontal state), and can be positioned and fixed in the vertical or horizontal state. As shown in FIG. 3, when the pair of the seat plate portions 11*p* is positioned and fixed in the horizontal state, a seat plate 11 of the vehicle is constituted by the seat plate portions 11*p*. Note that the selection of the vertical or horizontal state will be explained in detail below. Further, to allow easy understanding of the seat plate portions, in FIG. 3, only the seat plate portions and the lower frame where the seat plate portions are connected are shown.

A pair of left and right foot plates 12 is mounted on the front and lower portions of the connecting frames 4, that is, on the horizontal portion 4*lh* of the connecting frame lower portion 4*l*. Each foot plate 12 is mounted on the horizontal portion 4*lh* of the connecting frame lower portion 4*l* so that the foot plate can pivot about the horizontal axis extending in the longitudinal direction. Each foot plate 12 can pivot between a state where the foot plate extends vertically upwards (hereinafter referred to as vertical state) and a state where the foot plate extends horizontally inwards (hereinafter referred to as horizontal state), and can be positioned and fixed in the vertical or horizontal state. The selection of the vertical or horizontal state will be explained in detail below.

The vehicle of the embodiment comprises means 13 for braking the movement of the vehicle. The braking means comprises a frame (hereinafter referred to as U-shaped frame) 13*u* having generally U-shape and extending from the front area of the vehicle to the lateral rear sides thereof, a pair of left and right bars (hereinafter referred to as vertical bars) 13*v* each connected to the generally central portion of the lateral portion of the U-shaped frame and extending vertically downwards, members 18*g* for slidably housing the vertical bars 13*v* and guiding the slide movement of the vertical bars 13*v*, and members (hereinafter referred to as grounding members) 13*m* each connected to the lower end of the vertical bar 13*v*. The rearmost portions of the U-shaped frame 13*u* are pivotably mounted on the lateral portions of the lower frame horizontal portions 3*h*. Further, the front portion of the U-shaped frame 13*u* is connected to the front portion of the lower frame horizontal portion 3*h* via biasing means such as a coil spring 14. In addition, an engagement plate 15 is mounted on the front portion of the lower frame horizontal portion 3*h*, which plate 15 engages the front portion of the U-shaped frame 13*u* to maintain the U-shaped frame 13*u* at an upper position.

When the front portion of the U-shaped frame 13*u* is engaged with the engagement plate 15 against the biasing force of the spring 14, the grounding members 13*m* are maintained at a position raised upwards from the surface G of the floor. When the upper end of the engagement plate 15 is withdrawn rearwards, and thus is bent, the front portion of the U-shaped frame 13*u* is released from the engagement plate 15, and thus the u-shaped frame 13*u* is withdrawn downwards by the biasing force of the spring 14, and then the vertical bars 13*v* are guided by the guide means 13*g* and move downwards, and then the grounding members 13*m* contact the surface G of the floor. In this way, the vehicle is braked. According to this, the performance of braking the vehicle is high since the vehicle is braked simultaneously at both sides thereof. Further, the braking means of this embodiment does not exert a braking force directly to the front and rear wheels 9 and 7, so the vehicle can be braked using the braking means having relatively simple mechanism of the invention even if free casters are used as the front and rear wheels 9 and 7. That is, a mechanism more complicated than that of the braking means of the invention is necessary to exert the braking force directly to the free casters, but according to the invention, the vehicle can be braked by a relatively simple mechanism.

Advantages of the above explained vehicle will be explained in the below.

In the above explained vehicle, a person (hereinafter referred to as user) using the vehicle can stand within a space surrounded by the upper, lower and connecting frames 2, 3 and 4, and can walk with the vehicle, leaning the user's body on the upper frame 2, or leaning the user's hand on the upper frame 2. According to this, a user with disabled legs can walk or be rehabilitated. Note that the seat plate portions 11*p* are positioned in the vertical state when the user walks using the vehicle. That is, when the user walks using the vehicle, the seat plate portions 11*p* are removed from an area (hereinafter referred to as leg moving area) where the legs of the walking user move. According to this, the user can walk without being interrupted by the seat plate portions 11*p*. Further, when the user becomes exhausted and wants to rest while the user walks using the vehicle, the seat plate portions 11*p* are pivoted so that the seat plate portions 11*p* project into the leg moving area and are positioned in the horizontal state. In this way, the user can rest by sitting on the seat plate 11 formed by the seat plate portions 11*p*.

Further, when the user walks using the vehicle, the foot plates 12 are positioned in the vertical state. That is, the foot plates 12 are removed from the leg moving area. According to this, the user can walk without being interrupted by the foot plates 12. When the user rests, sitting on the seat plate 11, the foot plates 12 are projected into the leg moving area and positioned at the horizontal state. In this way, the user can rest, putting the user's feet on the foot plates 12.

Further, the vehicle of the invention has a function that a helper can move or carry a person. That is, in an emergency when it is necessary to move or carry a person who cannot walk by the user (hereinafter referred to as person in need of help) to the destination, a person (hereinafter referred to as helper) who helps the person in need of help sits the person in need of help on the seat plate of the vehicle, and then pushes or pulls the vehicle to move the same to carry the person in need of help to the destination.

In the above explained vehicle, there is no object between the lower front ends of the horizontal portions of the connecting frame lower portions 4*l* which are spaced from each other. In addition, the width between the horizontal portions of the connecting frame lower portions 4*l* is larger than that of a standard sitting type stool T (as shown by chain line in FIGS. 1 and 2; hereinafter only referred to as "stool"). Further, the level of the front portion 3*f* of the lower frame horizontal portion 3*h* is higher than that of the seat of the standard stool T. According to this, when the user enters into a restroom using the vehicle, the front portion of the lower frame horizontal portion 3*h* can pass over the seat of the stool T. In this way, the user can use the vehicle as a support in the restroom.

Further, in the above vehicle, the level of the seat plate portions 11*p*, when the seat plate portions 11 are projected into the leg moving area to come into a horizontal state, is higher than the level of the seat of the standard stool T. According to this, the seat plate portions lip are maintained above the stool T. Further, as will be understood with reference to FIG. 3, a space is formed between the seat plate portions 11*p* when the seat plate portions 11*p* are projected into the leg moving area to come into the horizontal state. Therefore, the user can use the vehicle, sitting on the seat plate 11 with the seat plate portions 11*p* being maintained above the stool T.

Of course, the seat plate 11 may be formed at a low level. In this case, the seat plate portions 11*p* may be mounted on an additional frame which extends parallel to the lower frame horizontal portion 3*h* and is connected to the lower frame vertical portions 3*v* and the vertical portion 4*lv* of the connecting frame lower portions 4*l* at the low area of the lower frame horizontal portion 3*h*, or which is mounted on the lower frame horizontal portion 3*h*, depending thereon. According to this, the surface of the seat can be formed near the surface G of the floor.

Further, it is advantageous that the upper frame 2 can be easily replaced with an upper frame having a different shape. According to this, the upper frame 2 having the optimum shape can be selected, depending on the shape of the body of the user, and can be connected to the connecting frame 4, and then the user can use the vehicle.

Arrangements shown in FIGS. 4–11 can be employed as a seat plate having advantages similar to those explained above. In an embodiment shown in FIG. 4, a pair of seat plate portions 11*p* is provided in front of the frame connecting portion between the lower frame 3 and the connecting frame 4 so that the seat plate portions 11*p* can pivot about the horizontal axis extending in the longitudinal direction. In an embodiment shown in FIG. 5, two pairs of seat plate portions 11*p* are provided at the rear of the frame connecting portion so that the seat plate portions 11*p* can pivot about the horizontal axis extending in the longitudinal direction. In an embodiment shown in FIG. 6, a pair of seat plate portions 11*p* is provided at the rear of the frame connecting portion so that the seat plate portions 11*p* can pivot about the horizontal axis extending in the longitudinal direction, but no space is formed between the seat plate portions 11*p* when the seat plate portions 11*p* are positioned to extend horizontally inwards. In an embodiment shown in FIG. 7, a seat plate 11 is mounted on one of the horizontal portions of the lower frame 3 at the rear of the frame connecting portion so that the seat plate 11 can pivot about a horizontal axis extending in the longitudinal direction. In an embodiment shown in FIG. 8, a pair of seat plate portions 11*p* is provided in front of the frame connecting portion and a pair of seat plate portions 11*p* is provided at the rear of the frame connecting portion so that the seat plate portions can pivot about a horizontal axis extending in the longitudinal direction.

Figure 9:
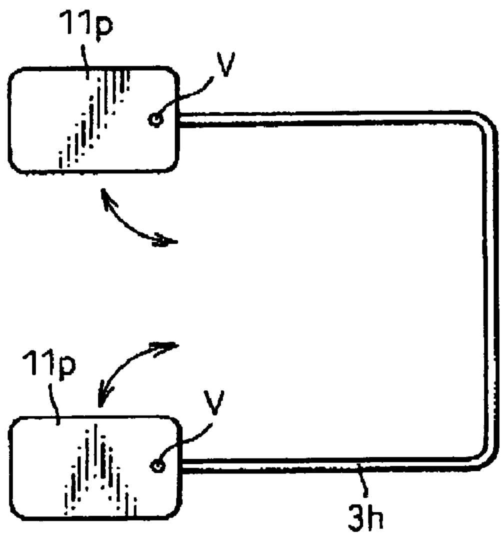
FIG. 9 is a plan view, similar to FIG. 3, of a seat plate of a seventh embodiment.
Figure 10:
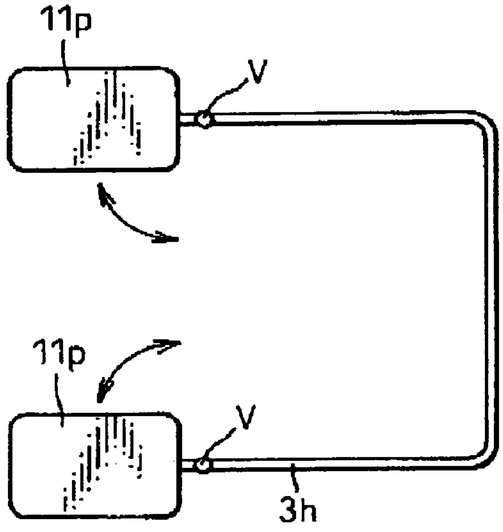
FIG. 10 is a plan view, similar to FIG. 3, of a seat plate of an eighth embodiment.
Figure 11:
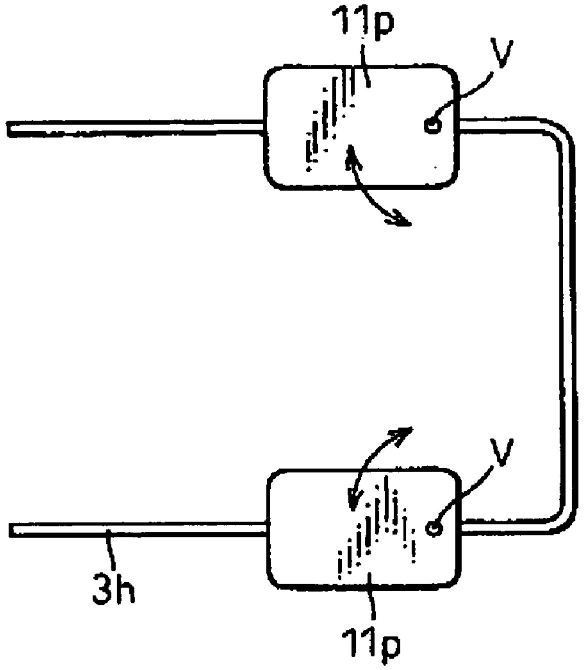
FIG. 11 is a plan view, similar to FIG. 3, of a seat plate of a ninth embodiment.

In an embodiment shown in FIG. 9, a pair of seat plate portions 11*p* is provided at the rear of the frame connecting portion, but the seat plate portions 11*p* are mounted on the horizontal portions of the lower frame 3 so that the seat plate portions 11*p* can pivot about a vertical axis v. In an embodiment shown in FIG. 10, a pair of seat plate portions 11*p* is provided at the rear of the frame connecting portion and is fixed on the lower frame horizontal portion 3*h* and the lower frame horizontal portion 3*h* can pivot about a vertical axis V. In an embodiment shown in FIG. 11, a pair of seat plate portions 11*p* is provided in front of the frame connecting portion but the seat plate portions 11*p* are mounted on the lower frame horizontal portions 3*h* so that the seat plate portions 11*p* can pivot about a vertical axis v.

Figure 12:
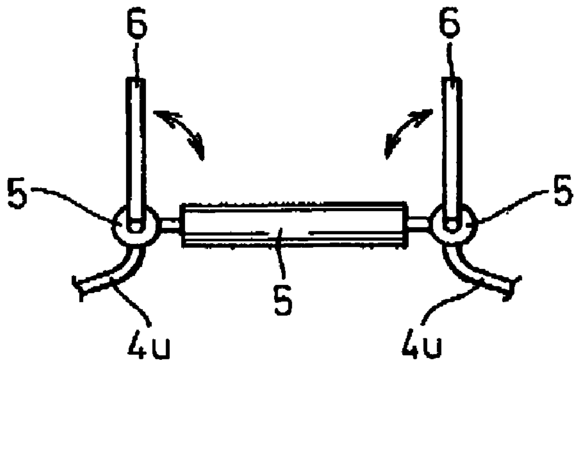
FIG. 12 is a back view of a handle formed in a different manner from a handle shown in FIG. 1.

The handles 6 mounted on the upper frame lateral portions 2*s* are suitable for the user to grip when the user moves, facing rearwards, sitting on the seat plate 11. Further, the handles 6 may be formed so that the handles can pivot horizontally inwards about a horizontal axis as shown in FIG. 12. According to this, the handles 6 are pivoted horizontally inwards and then the user can use the handles as a back support when the user rests on the seat plate 11.

Further, the seat plate portions 11*p* can be used as other than as the seat plate 11 for a rest. For example, the user sitting on the seat plate 11 can be rehabilitated by moving forwards with the user's legs. Further, the user can be rehabilitated by standing up from the seat plate 11 and sitting on the seat plate 11. Further, the seat plate 11 can be used as a handrail when a person lying down moves to the vehicle. Further, the user can move toward a sink using the vehicle, and after the user arrives at the sink, the user can sit on the seat plate 11 when the user washes dishes.

Further, back seat plates may be mounted on the rear edges of the seat plate portions 11*a* so that each back seat plate can pivot between the horizontal and vertical states. In this case, when the back seat plate is in the horizontal state, the back seat plate is on the upper wall face of the corresponding seat plate portion 11*a*, and on the other hand, when the back seat plate is in the vertical state, the back seat plate extends upwards from the rear edge of the corresponding seat plate portions 11*a*. When the back seat plates are in the vertical state, the back seat plates can be used as a back seat. Further, when the seat plate portions 11*a* are used as the seat plate 11 with the back seat plate in the horizontal state, the level of the seat surface where the user sits is higher than that of the seat surface when the seat plate portions 11*a* are used as the seat plate 11 with the back seat plate being in the vertical state.

Further, when a process for providing waterproof characteristics is applied to the entire of the vehicle, the vehicle of the invention can be used as a supporting device when the user takes a shower.

Further, aluminum can be used as a material for forming the frames, but the user of the vehicle leans the user's weight on the frames when the user walks, so the stability of the vehicle is high when the weight of the frames is relatively heavy, and therefore, in order to avoid a risk of user falling down, iron is preferable. Of course, any material for forming the frames can be employed depending on the necessity and, for example, the frames may be formed of a plastic material.

What is claimed is:

1. A vehicle to assist walking having functions to help a person walk, and to allow a helper to move a person, wherein the vehicle comprises a frame extending around a body of a user of the vehicle to support the body of the user when the user walks using the vehicle, wheels mounted on the frame, and a seat plate comprising a pair of seat plate portions, wherein the seat plate portions are projectable from each side of the user to an area where legs of a walking user move, and wherein the seat plate portions are separably removed from the area where the legs of the walking user move when the user walks using the vehicle.

2. A vehicle to assist walking, as set forth in claim 1, wherein the seat plate is pivotable about a predetermined axis, and wherein the seat plate is projected to the area where the legs of the walking user move by pivoting the seat plate.

3. A vehicle to assist walking, as set forth in claim 2, wherein the predetermined axis is a horizontal axis.

4. A vehicle to assist walking, as set forth in claim 1, wherein the seat plate is projectable from around the lateral and rear side of the user to the area where the legs of the walking user move.

5. A vehicle to assist walking, as set forth in claim 1, wherein both seat portions are attached to a lower frame of the vehicle.

6. A vehicle to assist walking having functions to help a person walk, and to allow a helper to move a person, wherein the vehicle comprises a frame extending around a body of a person of the vehicle to support the body of the person when the person walks using the vehicle, wheels mounted on the frame, and a seat plate comprising a pair of seat plate portions, and wherein the seat plate portions is projectable from each side of the person to the area where legs of a walking person move, wherein the seat plate portions are removed from the area where the legs of the walking person move when the person walks using the vehicle, wherein the vehicle further comprises means for braking movement of the vehicle, the braking means having at least one braking frame biased downwardly by a spring, wherein when the movement of the vehicle should not be braked, the lower end of the braking frame is moved upwardly against the biasing force of the spring and is kept remote from and above the ground by engaging the braking frame with an engagement plate, and wherein when the movement of the vehicle should be braked, the braking frame is disengaged from the engagement plate to move the braking frame downwardly by gravity and the biasing force of the spring to contact the lower end of the braking frame to the ground by gravity and the biasing force of the spring.

7. A vehicle to assist walking having functions to help a person walk, and to allow a helper to move a person, wherein the vehicle comprises a frame extending around a body of the person of the vehicle to support the body of the person when the person walks using the vehicle, wheels mounted on the frame, and a seat plate comprising a pair of seat plate portions, and wherein the seat plate portions is projectable from each side of the person to the area where legs of a walking person move, wherein the seat plate portions are removed from the area where the legs of the walking person move when the person walks using the vehicle, wherein the vehicle further comprises, at its rear area, at least one vertically extending handle which a helper grasps when the helper moves a person by using the vehicle, and the handle is pivotable between a vertical position and a horizontal position, and wherein when the handle extends horizontally, the handle extends behind the person of the vehicle so that the person can use the handle as a backrest.

* * * * *